May 3, 1938.  T. M. FINLEY  2,115,711
PROPELLER DRIVEN VEHICLE
Filed May 20, 1935   7 Sheets-Sheet 2

Inventor
Thomas M. Finley,
By Harry F. Riley
Attorney

May 3, 1938.  T. M. FINLEY  2,115,711
PROPELLER DRIVEN VEHICLE
Filed May 20, 1935  7 Sheets-Sheet 3

Fig. 4.

Inventor
Thomas M. Finley,
By Harry T. Riley
Attorney

Patented May 3, 1938

2,115,711

UNITED STATES PATENT OFFICE 2,115,711

PROPELLER DRIVEN VEHICLE

Thomas M. Finley, St. Louis, Mo.

Application May 20, 1935, Serial No. 22,467

35 Claims. (Cl. 244—73)

The invention relates to improvements in propeller driven vehicles.

One of the principal objects of the invention is to enable flying machines, highway machines, railroad carriages, boats and other machines or means of conveyance to be driven by a propeller or a plurality of propellers operating on an improved thrust principle in a tunnel through the body of the vehicle and, capable of displacing and forcing through the tunnel air from the front of the body and of simultaneously creating adjacent the front edges or surfaces of the body a vacuum adapted to permit practically a forward unimpeded movement of the body under the influence of the propeller or propellers.

The primary object of the invention is to improve the design of machines so that the necessary air displacement in their normal operation may be accomplished by mechanical means such as specially designed propellers adapted for such displacement work and located within the tunnel rather than by the body of the machine as is the case with designs now in use.

These propellers working in the flared front end of a tunnel are unable because of the walls of the flared front end of the tunnel to draw air from around said walls and must therefore receive their necessary operating air from the front only through the large opening formed by the flared portion of the tunnel at the contact end of the machine. This causes the propellers to superinduce what may be termed a preslip-stream. It is to be understood that the term preslip-stream means the body of air drawn to the propeller by the force of the propeller's action. The air will flow to these forwardly located propellers from in front of the contact end of the machine with approximately the same velocity as the slip-stream proper flows away from the propellers and back through the tunnel.

The preslip-stream flowing with high velocity to propellers through the center of the flared front end draws the air from between its flowing body and the surrounding walls of the flared front end thereby creating a vacuum between the preslip-stream and the surrounding walls of the machine. This vacuum space is larger and of more intense or perfect nature than the vacuum above an airplane wing very much the same and by the same law of physics which produces a vacuum at the contact end of the machine of the present invention. This vacuum relieves the atmospheric pressure from in front of the body of the machine and thereby causes or results in very restricted resistance to the forward movement of the body of the machine and creates tremendous speed possibilities.

As the slip-stream leaves the propeller and moves rearwardly through the tunnel it contracts in size, becomes more dense and will create a harmful vacuum between it and the surrounding walls of the tunnel unless the tunnel be effectively ventilated; that is, unless air by some practical means is fed into the tunnel behind each propeller or set of propellers to fill the vacuum space between the slip-stream and the surrounding walls of the tunnel. Such a vacuum if allowed to exist will destroy much of the velocity of the slip-stream and largely nullify its efficiency. In fact, it has been found almost impossible to drive a slip-stream through a long tunnel not provided with the perfect ventilation afforded by the present invention, and it is an object of the invention to supply to the vacuum space between the slip-stream and the walls of the tunnel air free from external pressure and induced by vacuum action from within the tunnel so as not to interfere with the slip-stream or produce any harmful effect on the same.

It will be understood that various changes in the form, proportions and design of propeller driven vehicles within the scope of the appended claims may be resorted to without departing from the spirit or sacrificing any of the advantages of the invention.

Figure 3:
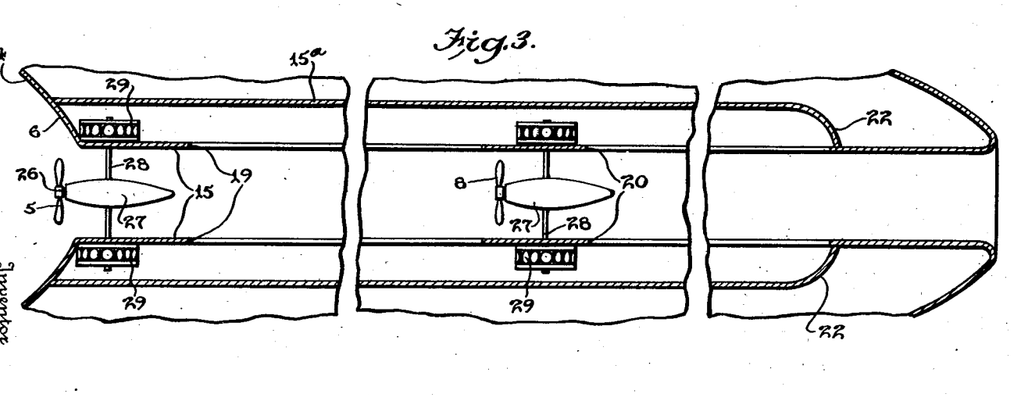
Figure 3 is a horizontal sectional view on a larger scale than Figure 2 showing the tunnel and channel arrangement, parts being broken away.
Figure 4:
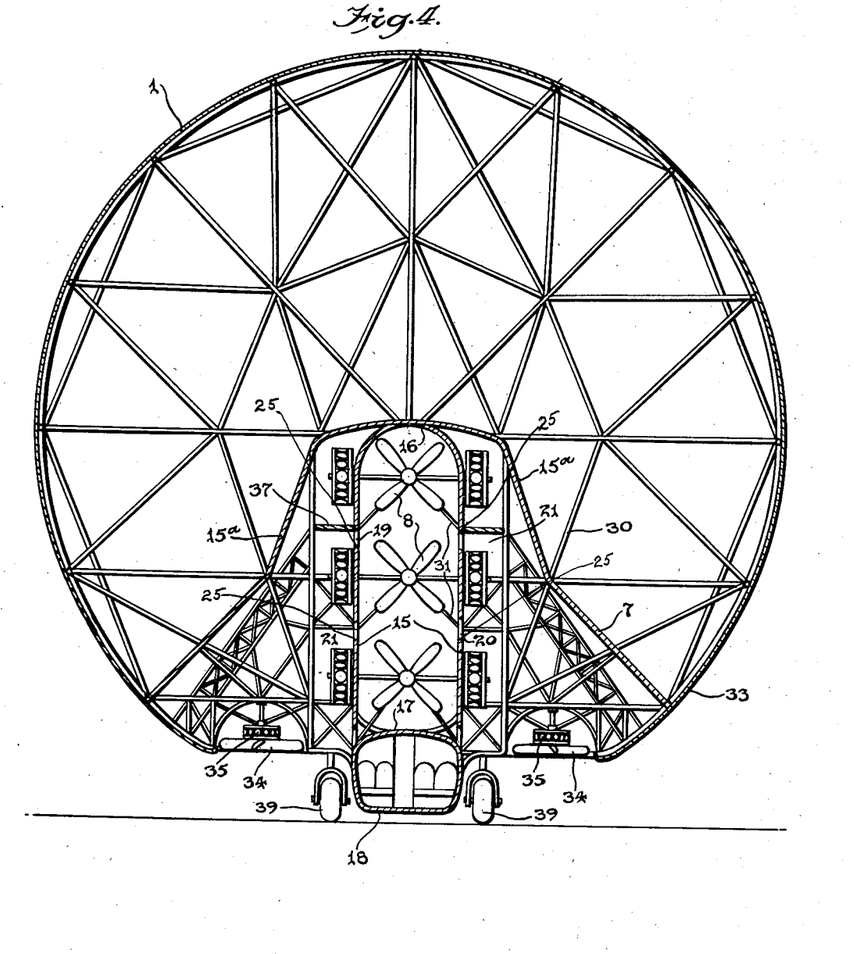
Figure 4 is a transverse sectional view taken at an intermediate point between the fore and aft propellers.
Figure 5:
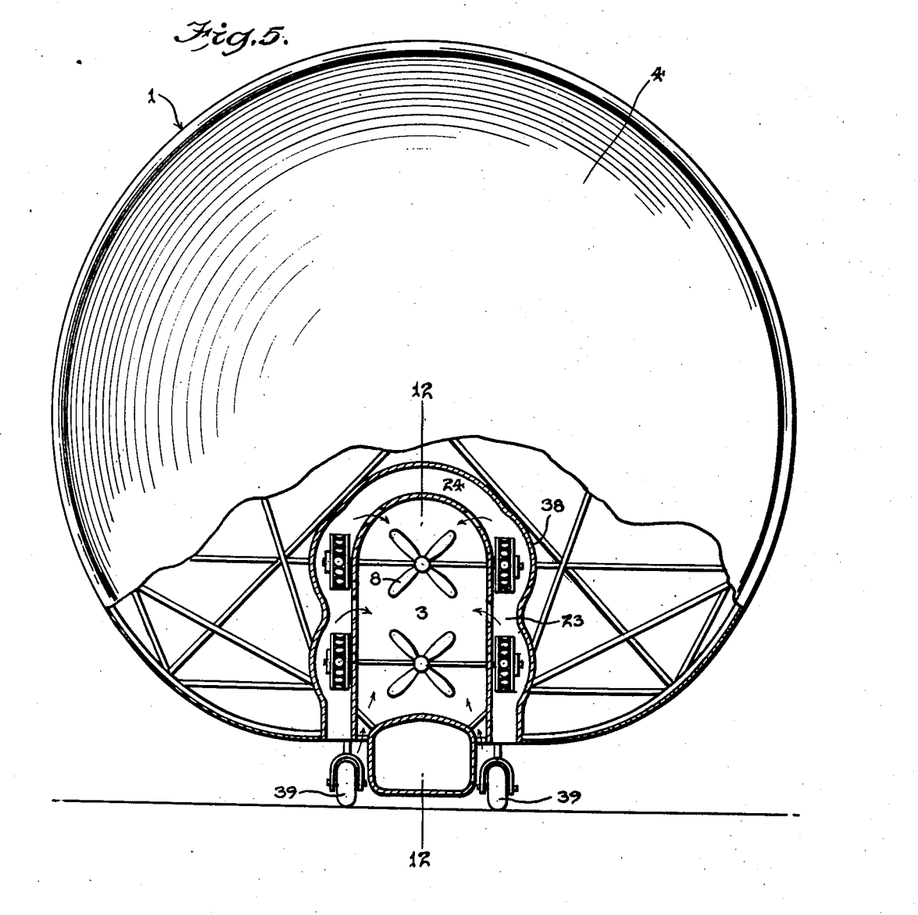
Figure 5 is a front elevation partly in section illustrating a modification of the invention showing the channel arranged at both sides and the top of the tunnel.

Referring particularly to Figures 1 to 6 inclusive of the accompanying drawings in which is illustrated a gas machine, 1 designates the body of the machine preferably substantially cylindrical in cross-section with continuous unbroken top and side walls as clearly illustrated in Figures 4 and 5 of the drawings and having a gradual longitudinal taper from its front end to its rear portion 2 which is provided with a pronounced taper. The body is provided at its lower portion with an interior longitudinal tunnel 3 spaced from the top and side walls of the body and having a flaring entrance 4 and being of substantially uniform cross-sectional area from the inner terminal of the front entrance to the extreme rear end of the body as clearly illustrated in Figures 2 and 3 of the drawings. A series or group of forward propellers 5 are located within the flaring entrance to the tunnel at the inner terminus thereof and at a distance from the front contact edge 6 of the body approximately equal to the distance across the flaring entrance at its widest portion; namely, at the contact edge of the same. The wall 6 of the flaring entrance is preferably slightly concave from the tunnel proper to within a short distance of the contact edge 6 where it is reversely curved to present a slightly rounded or convex surface 7 but the design of the flaring entrance may be varied as will be readily understood. The forward propellers are preferably arranged in stepped formation, the lowermost one being slightly in advance of the intermediate propeller and the intermediate propeller being slightly in advance of the uppermost propeller but the arrangement may be varied as desired and the propellers may be located in the same vertical plane similar to the arrangement of rear or aft propellers 8 which are located at an intermediate point between midships and the rear end of the body.

Figure 6:
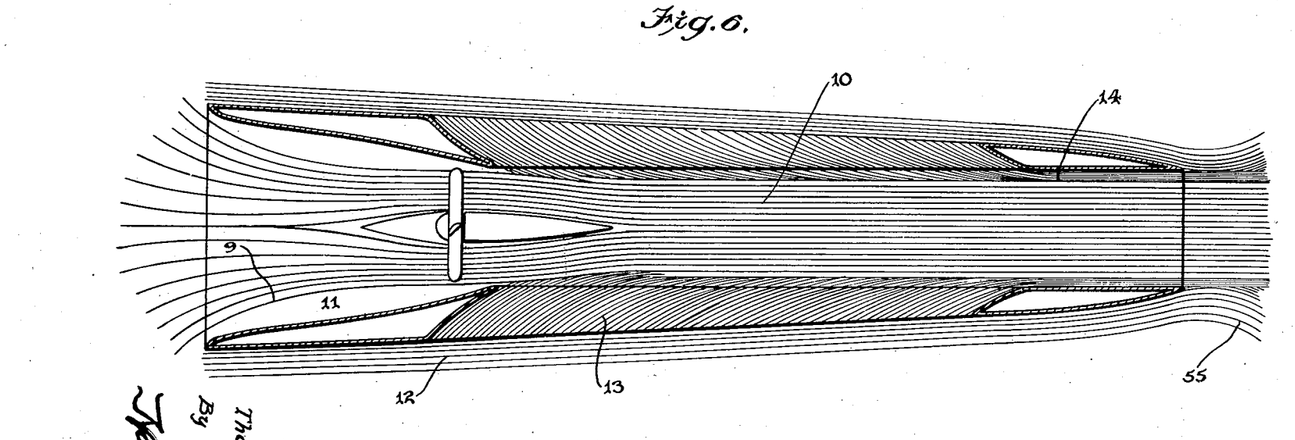
Figure 6 is a diagrammatic view in horizontal section illustrating the preslip-stream and the slip-stream and indicating the passage of the air through the ventilating or breather openings to the vacuum space between the slip-stream and the walls of the tunnel without being affected by the velocity of the air exteriorly of the body of the machine.

As illustrated diagrammatically in Figure 6 of the drawings the front propellers are adapted to draw into the flaring mouth of the tunnel air from the front of the machine and they form a preslip-stream 9 indicated by the curved lines within the flaring entrance to the tunnel in Figure 6 and the preslip-stream 9 which has substantially the same velocity as the slip-stream 10 or blast of air from the propellers creates a vacuum space 11 between the preslip-stream and the walls of the flaring entrance. This vacuum space 11 extends to and around the front contact edge of the body and the air-pack which is formed at the front contact end of gas machines of the ordinary type and which forms a pronounced resistance to the forward movement of machines of that type is eliminated by the present invention and is converted into a preslip-stream which produces the said vacuum space 11. The formation of the vacuum space 11 at the flaring entrance to the tunnel and at the contact edge of the body of the machine enables the machine of the present invention to be propelled through the air at tremendous speeds impossible with machines of a type forming air-packs at the front or contact end and impeded by the same. The air at the side of the body exterior thereof is indicated in Figure 6 of the drawings by the lines 12 and the lines 13 in Figure 6 indicate the air fed to the vacuum space 14 between the slip-stream 10 and the walls of the tunnel.

The tunnel proper extending from the flaring entrance to the extreme rear end of the body of the machine may be of various designs so long as the uniform cross-sectional area is maintained throughout the length of the tunnel. In the machine illustrated in Figures 1 to 4 inclusive the tunnel proper has spaced vertical parallel side walls 15 and a transversely rounded or arched top wall 16 and a bottom wall 17, a portion of which may constitute the top of a cabin 18. The fore and aft propellers are located at the top, central and lower portions of the tunnel which in Figures 1 to 4 inclusive is provided in its side walls with front and rear longitudinal ventilating or breather openings 19 and 20, which communicate with side channels 21 located at opposite sides of the tunnel and extending from the bottom to the top of the same and from the front portion of the body to the rear portion thereof. The channels are closed at their rear and front ends by rear walls 22 and by the walls 6 of the flaring entrance to the tunnel as illustrated in Figure 3 of the drawings but the channels 21 may be closed at their front and rear ends in any other desired manner. The channels 21 are also closed at the top and do not extend over the top of the tunnel but as illustrated in the form of the invention shown in Figure 5 of the drawings the machine may be provided with a channel 23 having a transversely curved or arched top portion 24 which with the side portions forms the channel extending upward from the bottom at one side of the tunnel and over the top and downward on the opposite side of the tunnel to the bottom thereof. The channels 21 and 23 are open exterior of the machine at the bottom thereof and as the channels are closed at their front and rear ends the air within the channels is still and is adapted to be fed into the vacuum spaces between the slip-stream or slip-streams and the walls of the tunnel in a gentle manner by vacuum action alone so that the air is uniformly distributed throughout the vacuum space without affecting the velocity of the slip-stream in its passage through the tunnel.

The ventilation or breather openings 19 extend from a point slightly in rear of the forward propellers 5 to a point slightly in advance of the rear propellers 8 and the rear ventilation or breather openings 20 extend from a point slightly in rear of the rear propellers to within a short distance of the rear end of the body of the machine. The openings 19 and 20 are relatively long and narrow and are preferably located adjacent the planes of the bottoms of the propellers with which they are associated but they may be located at any other desired points and they, of course, may vary in size and number. The upper and lower walls 25 of the openings 19 and 20 are inclined and extend upwardly and inwardly from the outer faces of the side walls of the tunnel so that the air entering the tunnel through the breather or ventilation openings passes upwardly and inwardly into the tunnel at a plurality of points at each side of the tunnel and is uniformly distributed to and is adapted to eliminate the vacuum spaces between the slip-streams and the walls of the tunnel.

The propellers which are of the usual type employed in airplanes and gas machines are mounted on relatively short longitudinal shafts 26 which are suitably mounted in streamline gear housings 27 containing a suitable gearing (not shown) for connecting the propeller shafts with transverse shafts 28 extending through the side walls of the tunnel and connected with motors 29 which are located in the channels at opposite sides of the tunnel and which receive the necessary air from the channels which constitute air reservoirs for both the motors and the ventilating means of the tunnel. The streamline gear housings are connected with the walls of the tunnel and with the framework 30 of the machine by suitable supports 31 preferably consisting of bracing members extending from the gear housings to the walls of the tunnel.

As any suitable means may be provided for supporting the gear housings and as any suitable type of motor may be employed for driving the propellers, a detail description of the motors and the gearing for connecting the motors with the propellers is deemed unnecessary. Twin motors are provided for each of the propellers and are designed to be operated either simultaneously or independently and in event of repairs being necessary to one motor of a propeller another motor will always be in readiness for use.

The machine is designed to be provided at its rear end with a rudder 32 and with elevators and stabilizers of the usual construction and it will be equipped with the usual controls for operating and as these may be of any preferred construction, detail illustration and description thereof are deemed unnecessary. Also the framework of the machine may be of any desired construction and is provided with an outer covering 33. The machine may be equipped with suitable lifting propellers 34 as illustrated in Figure 4 of the drawings and when these are employed the outer side walls 15a of the channels are inclined and diverge downwardly and outwardly to provide ample space for the operation of the lifting propellers 34. Each lifting propeller 34 is equipped with a motor 35 and as the operation of the lifting propellers will generally not be necessary after the machine has made its ascent and is traveling forward they will not interfere with the ventilation of the tunnel while the propellers for driving the machine forward are in operation.

Figure 1:
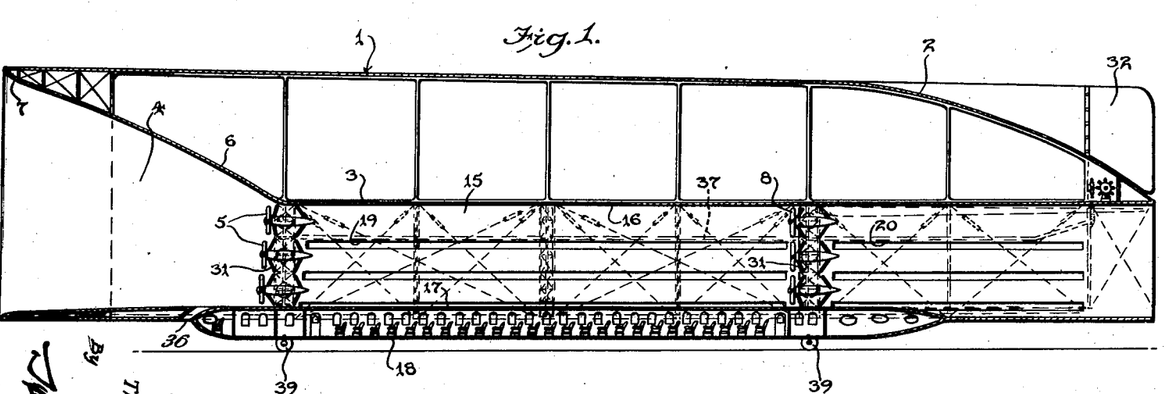
Figure 1 is a longitudinal sectional view of a gas or flying machine constructed in accordance with this invention.
Figure 2:
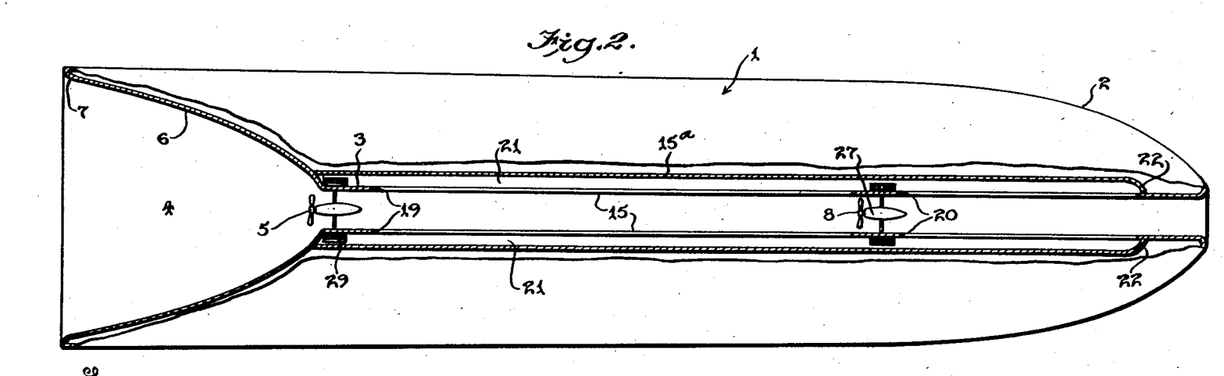
Figure 2 is a plan view partly in section illustrating the construction and arrangement of the tunnel and channel of a machine having fore and aft propellers.

The cabin may be conveniently located at the bottom of the tunnel and may be of any desired length and in practice will have all the necessary equipment for the control of the machine and for the accommodation of operators and passengers. As illustrated in Figure 1 of the drawings, a bottom opening 36 may be provided in the flaring entrance to the tunnel at the front of the cabin. Platforms 37 may be located in the upper portions of the channels above the top ventilation or breather openings and where necessary the outer side walls of the channels may have outwardly bowed portions 38 adjacent the motors to provide the desired space at these points. The machine is equipped with suitable landing gear of any desired construction including wheels 39 which may be of any desired number and arrangement.

Figure 7:
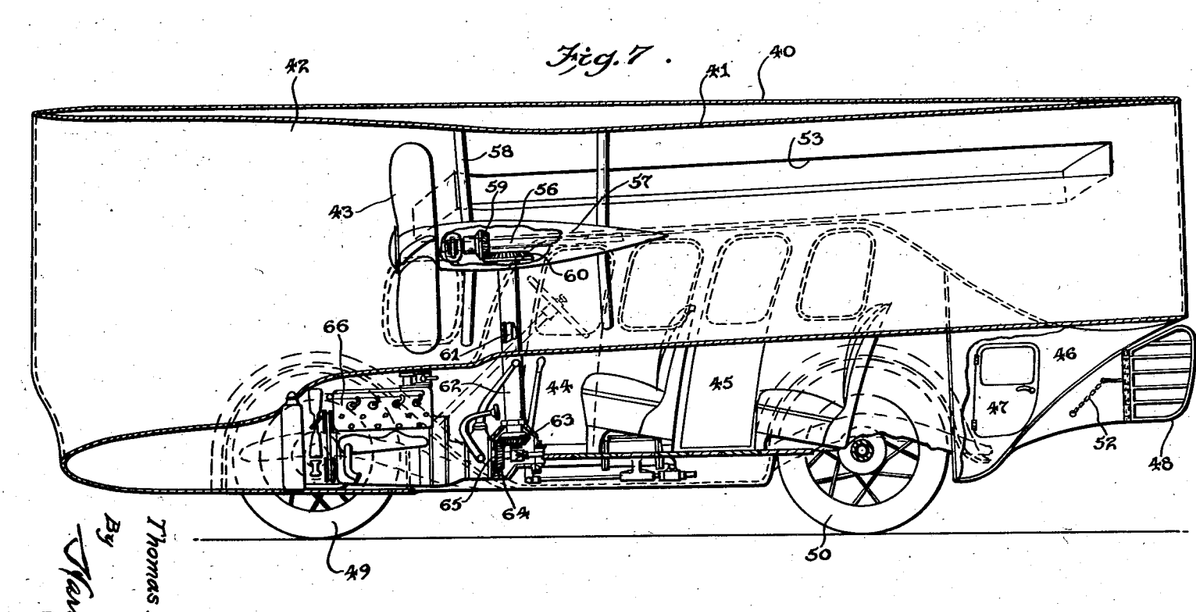
Figure 7 is a longitudinal sectional view of a propeller driven road vehicle of the automobile type embodying the present invention.
Figure 8:
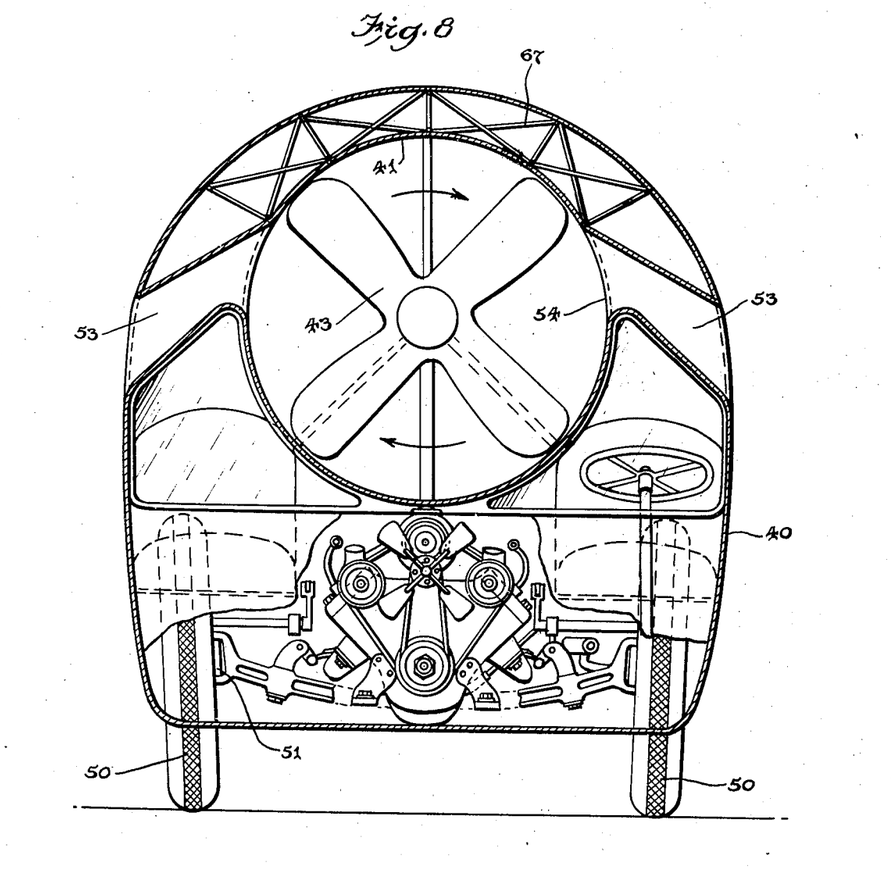
Figure 8 is a transverse sectional view of the same.

In Figures 7 and 8 the invention is shown applied to a propeller driven vehicle of the automobile type. The body 40 is preferably constructed of metal but any suitable material may be employed in the construction of the same and it is provided with a tunnel 41 having a flaring entrance 42 of substantially the same design as the flaring entrance to the tunnel of the gas machine. The body preferably consists of an outer metal shell and the tunnel is preferably formed by an inner metal shell united at its front and rear ends to the body and having a substantially uniform cross-sectional area throughout its entire length from the inner terminus of the flaring entrance to the rear end of the body.

The road vehicle is driven by a propeller 43 located at the inner portion of the flaring mouth of the tunnel 41 which is preferably circular in cross-section, the shell of the tunnel being cylindrical in rear of the flaring entrance 42. The tunnel is located within the upper portion of the body 40 and the lower portion of the body at the sides of the tunnel constitutes a passenger compartment 44 and is designed to be equipped with seats for the accommodation of the operator and passengers. The body is designed to be provided at each side with a suitable door or doors 45 and the rear bottom portion 46 of the body is designed to constitute a luggage compartment and is provided with one or more doors 47 and is tapered at the bottom as clearly shown in Figure 10 to provide a space beneath the rear end of the tunnel for a rudder 48 to assist in guiding the machine. The machine is provided with front and rear wheels 49 and 50, the front wheels having a pivotal mounting at 51 and constituting steering wheels. The ordinary steering mechanism is designed to be provided for the front steering wheels and the ordinary rudder controlling means 52 is connected with the rudder for operating the same. As the steering mechanism for operating the front wheels and the rudder control mechanism are of the usual construction and as any suitable mechanism may be employed for steering the machine by the operation of the front wheels and the rudder detail illustration of the same is deemed unnecessary.

The body is provided at opposite sides above the passenger compartment with channels 53 which extend downwardly and outwardly from ventilation or breather openings 54 in the sides of the tunnel. The ventilation or breather openings extend from a point slightly in rear of the propeller to near the rear end of the body of the machine and the channels are closed at their front and rear ends. The body 40 of the machine at the tunnel has a slight rearward taper substantially as indicated in Figure 6 of the drawings so that the air 12 passing along the sides of the body will not through any speed of the machine be forced into the channels and affect the gentle breathing action designed and required for uniformly feeding air to the vacuum space between the slip-stream of the propeller and the walls of the tunnel. The air indicated by the lines 12 at the sides of the body in leaving the rear end of the same tends to curve inwardly as indicated by the curved lines 55 in Figure 6 of the drawings and thereby imparts to the body the forward push heretofore explained.

The propeller 43 is mounted on a relatively short longitudinal propeller shaft 56 which is journalled in suitable bearings in the streamline housing 57 supported by suitable bracing or supporting members 58 within the front portion of the tunnel. The propeller shaft has mounted on it an approximately vertically disposed bevel pinion 59 which meshes with a bevel gear 60 of an upright shaft 61 extending through a post or casing 62 and connected by bevel gears 63 and 64 with an engine driven shaft 65. The engine 66 which is preferably an internal combustion motor is designed to be connected by a suitable transmission gearing with the motor driven shaft and the usual clutch mechanism and brake mechanism with which ordinary automobiles are equipped are designed to be provided as indicated in Figures 7 and 8 of the drawings. As the particular construction of the motor and control mechanism is designed to be of the usual construction and as any ordinary construction may be employed for this purpose, further description thereof is deemed unnecessary.

The shell of the tunnel 41 is connected at its upper portion with the body by suitable bracing members 67 which are located above the channels and any suitable bracing and reinforcing means may be provided at other portions of the tunnel where required.

The propeller driven road vehicle shown in Figures 7 and 8 operates on the same principle as the gas machine illustrated in Figures 1 to 5 as will be clear from the diagrammatic view shown in Figure 6 of the drawings and substantially the same design and principle of operation may be applied to any type of vehicle or conveyance operable on land or water or in the air.

It will be clear that the propellers working in the flared front end of the tunnel of the gas machine and the road machine are unable to draw air from around them because of the walls of the flared front end of the tunnel and necessarily receive their operating air from the front only through the large opening at the contact end of the machine and that this causes the propeller or propellers to superinduce a preslip-stream. The air flows to these forwardly located propellers from in front of the contact end of the machine and with approximately the same velocity as the slip-stream or blast of air which flows away from the propellers back through the tunnel.

The preslip-stream in both types of machines flowing with high velocity to the propellers through the center of the flared front end creates a vacuum between the preslip-stream and the surrounding walls of the said flared front end of the tunnel and effectually eliminates an airpack at the front of the machine and enables the body of the machine to move forwardly with practically little resistance and with heretofore unachieved speed possibilities.

It will also be seen that as the slip-stream leaves the propeller and moves backward through the tunnel as indicated diagrammatically in Figure 6 of the drawings it contracts in size and becomes more dense and tends to create a vacuum between it and the surrounding walls of the tunnel and that the vacuum space is fed or supplied with air through a gentle breather action and that the harmful vacuum ordinarily resulting from a slip-stream moving through a tunnel is eliminated and that the slip-stream forms an air rail on which the machine rides and which strengthens and supports the body of the machine throughout its entire length.

The slip-stream which is expelled from the rear end of the tunnel with tremendous force produces a rocket effect on the body and propels the body of the machine forward into the vacuum space ahead of the contact end of the machine. Also the slip-stream as it is discharged from the rear end of the tunnel causes the air around the rear end of the body to take a swift movement along the rear sloping sides of the body of the machine as it moves backward and inward toward the expelled slip-stream and it causes a decided forward push on the body and effectually eliminates any air suck at the rear end of the machine.

The features of the present invention are applicable to all types of vehicles and in the case of small passenger machines where it becomes necessary to place the tunnel above the passenger compartment and is narrower than the passenger compartment the side channels or air reservoirs for feeding air to the vacuum space between the slip-stream and the walls of the tunnel necessarily occupy space outside of the passenger compartment and they may be arranged in any convenient position or location so long as the openings which are exposed at the exterior of the machine are shielded by the taper of the body of the machine or otherwise so that the body of the machine in its forward movement will not cause air to be forced into or through the air channels or reservoirs.

What is claimed is:

1. A propeller driven vehicle including a body having an air tunnel, and a propeller operating in the tunnel, said body having an air channel provided with side walls and closed at the front and back and arranged exteriorly of the tunnel and extending from the upper portion thereof to the bottom of the body and communicating with the tunnel for feeding air to the vacuum space between the slip-stream of the propeller and the walls of the tunnel.

2. A propeller driven vehicle including a body having an air tunnel, and a propeller operating in the tunnel, said body having a channel with side portions located exteriorly of the tunnel at opposite sides thereof and extending from the upper portion of the tunnel to the bottom of the body and communicating with the tunnel for feeding air to the vacuum space between the slip stream of the propeller and the walls of the tunnel.

3. A propeller driven vehicle including a body having an air tunnel, and a propeller operating in the tunnel, said body having an air channel with top and side portions arranged exteriorly of the tunnel at the top and sides thereof, the side portions extending to the bottom of the body and the channel being provided at a plurality of points with openings communicating with the tunnel for feeding air to the vacuum space between the slip stream of the propeller and the walls of the tunnel.

4. A propeller driven vehicle including a body having an interior air tunnel spaced from the sides of the body and extending entirely through it, and fore and aft propellers operating within the tunnel and arranged in groups, the members of each group being located one above another, said body being provided with an air channel arranged exteriorly of the tunnel and having front, rear and side walls and provided with openings located in rear of the groups of the propellers and at different elevations for feeding air free from external pressure to the tunnel at the vacuum spaces between the slip streams of the propellers and the walls of the tunnel.

5. A propeller driven vehicle including a body having an air tunnel extending entirely through it, fore and aft propellers operating within the tunnel, said body being provided at opposite sides of the tunnel with air channels having side walls and closed at the front and back and opening to the atmosphere at the bottom of the body and provided with openings communicating with the tunnel for feeding air to the vacuum spaces between the slip streams of the propellers and the walls of the tunnel, and motors located within the channels and operatively connected with the propellers.

6. A propeller driven vehicle of the surface type including a wheeled body having a longitudinal tunnel extending through the body, the latter being provided with a passenger compartment located below and at opposite sides of the tunnel for the accommodation of passengers and operator, a propeller operating in the tunnel, air channels having side walls and closed at the front and back and located within the body at opposite sides of the tunnel and exteriorly of the passenger compartment and communicating with the tunnel in rear of the propeller, and a motor located within the compartment of the body and operatively connected with the propeller.

7. A propeller driven surface vehicle comprising a wheeled body having front steering wheels, said body being provided with an interior longitudinal tunnel spaced from the sides of the body, said body having a passenger compartment and provided at opposite sides of the same with channels having front, rear and side walls and extending to the exterior of the body and communicating with the tunnel and arranged to supply air to the vacuum space between the slip stream of the propeller and the walls of the tunnel, a propeller operating within the tunnel, a motor carried by the body and operatively connected with the propeller, and a rudder mounted on the body at the rear end of the tunnel and cooperating with the front steering wheels in the steering of the vehicle.

8. A propeller driven surface vehicle including a body comprising an outer shell and an inner substantially cylindrical shell having a flaring front portion and connected at its ends to the outer shell and forming a tunnel extending entirely through the body, the space within the outer shell exteriorly of the inner shell constituting compartment space, a propeller operating within the tunnel adjacent the inner end of the flared portion of the inner shell, said body being provided in rear of the propeller at opposite sides of the tunnel with air channels extending downwardly and outwardly from the tunnel and communicating with the latter for supplying air to the vacuum space between the slip stream of the propeller and the walls of the tunnel, and a motor carried by the body in the space between the inner and outer shells and operatively connected with the propeller.

9. A propeller driven vehicle including a propeller, and a body having means forming an air tunnel extending through the body and arranged to receive the slip stream from the propeller and having walls excluding from the tunnel air pressure produced by the forward movement of the vehicle, said vehicle being also provided with means for feeding to the tunnel in rear of the propeller at the vacuum space between the slip stream of the propeller and the walls of the tunnel air free from pressure produced by the forward movement of the vehicle.

10. A propeller driven vehicle including a body having means forming an air tunnel extending through the body, and a propeller operating within the tunnel, said body being also provided with means for feeding air free from pressure produced by the forward movement of the vehicle to the tunnel in rear of the propeller at the vacuum space between the slip stream of the propeller and the walls of the tunnel.

11. A propeller driven vehicle including a propeller, and a body having means forming an air tunnel arranged to receive the propeller and being of substantially uniform cross sectional area in rear of the propeller, and means for feeding air to the tunnel in rear of the propeller at the vacuum space between the slip stream of the propeller and the walls of the tunnel.

12. A propeller driven vehicle including a body having means forming an air tunnel extending through the body and provided with a flaring entrance, a propeller operating within the flaring entrance adjacent the inner portion of the same, and means for feeding air free from pressure produced by the forward movement of the vehicle to the vacuum space between the slip stream of the propeller and the walls of the tunnel, said tunnel walls excluding from the tunnel air pressure produced by the forward movement of the vehicle.

13. A propeller driven vehicle including a body having means forming a longitudinal air tunnel extending through the body and provided with a flaring entrance and having walls excluding from the tunnel air pressure produced by the forward movement of the vehicle, said tunnel being substantially uniform in cross sectional area in rear of the flaring entrance, a propeller operating in the tunnel adjacent the inner portion of the flaring entrance to produce a pre-slip stream within the flaring entrance and a slip stream through the tunnel, and means for feeding air free from pressure produced by the forward movement of the vehicle to the tunnel at the vacuum space between the slip stream of the propeller and the walls of the tunnel.

14. A propeller driven vehicle including a body having means forming an air tunnel provided with a flaring entrance and having walls excluding from the tunnel air pressure produced by the forward movement of the vehicle, a propeller operating within the tunnel and arranged to produce a slip stream through the tunnel and a pre-slip stream within the flaring entrance to prevent an air pack at the front end of the body and at the same time creating a vacuum at the front contact end of the body and between the pre-slip stream and the walls of the flaring entrance, and means for feeding air free from the pressure produced by the forward movement of the vehicle to the tunnel at the vacuum space between the slip stream and the walls of the tunnel.

15. A propeller driven vehicle including a body substantially cylindrical cross sectionally having a pronounced taper at its rear terminal portion and provided with a slight gradual taper from its front end to the said tapered rear portion, said body being provided with means forming a longitudinal tunnel extending through the body and having walls excluding from the tunnel air pressure produced by the forward movement of the vehicle, a propeller operating within the tunnel, the latter being of substantially uniform cross sectional area in rear of the propeller, and means for feeding air free from the pressure produced by the forward movement of the vehicle to the tunnel in rear of the propeller at the vacuum space between the slip stream of the propeller and the walls of the tunnel.

16. A propeller driven vehicle including a body having a pronounced taper at its rear terminal portion and provided with means forming a longitudinal air tunnel extending entirely through the body and having a flaring entrance and being of substantially uniform cross sectional area from the flaring entrance to its rear end, said tunnel having walls excluding from the tunnel air pressure produced by the forward movement of the vehicle, a propeller operating within the tunnel adjacent the inner portion of said flaring entrance, and means for feeding air free from pressure produced by the forward movement of the vehicle to the tunnel in rear of the propeller at the vacuum space between the slip steam of the propeller and the walls of the tunnel.

17. A propeller driven vehicle including a body having a pronounced exterior taper at its rear terminal portion and provided with means forming a longitudinal tunnel extending entirely through the body and having walls excluding from the tunnel air pressure produced by the forward movement of the vehicle, a propeller operating within the tunnel, and means located in rear of the propeller for feeding air free from pressure produced by the forward movement of the vehicle through the wall of the tunnel to the vacuum space between the slip stream of the propeller and the walls of the tunnel.

18. A propeller driven vehicle including a body having means forming an air tunnel, a propeller operating in the tunnel, said body having means forming an air passage leading from the exterior of the body to the said tunnel and arranged to feed air free from pressure produced by the forward movement of the vehicle to the tunnel at the vacuum space between the slip stream of the propeller and the walls of the tunnel.

19. A propeller driven vehicle including a body having means forming an air tunnel spaced from the sides of the body, and a propeller located at the front end of the body and having its slip stream passing through the tunnel, said body being also provided with means forming an air channel communicating with the tunnel and with the outside atmosphere and arranged to be shielded by the body from air pressure produced by the forward movement of the machine for feeding air free from such pressure to the tunnel at the vacuum space between the slip stream of the propeller and the walls of the tunnel.

20. A propeller driven vehicle including a body having means forming an air tunnel having walls excluding from the tunnel air pressure produced by the forward movement of the vehicle, and a propeller operating in the tunnel, said body having means forming a channel with side portions located exteriorly of the tunnel at opposite sides thereof and provided with breather openings leading to the tunnel for feeding air free from pressure produced by the forward movement of the vehicle to the vacuum space between the slip stream of the propeller and the walls of the tunnel.

21. A propeller driven vehicle including a body having means forming an air tunnel with walls excluding from the tunnel air pressure produced by the forward movement of the vehicle, and a propeller operating in the tunnel, said body having means forming a channel with side and top portions arranged exteriorly of the tunnel and provided with breather openings communicating with the tunnel for supplying air free from pressure produced by the forward movement of the vehicle to the tunnel at the vacuum space between the slip stream of the propeller and the walls of the tunnel.

22. A propeller driven vehicle including a body having means forming an air tunnel with walls excluding from the tunnel air pressure produced by the forward movement of the vehicle, and a propeller operating in the tunnel, said body being also provided with means forming an air channel extending along the tunnel exteriorly thereof and having front and rear walls closing the ends of the channel, said channel communicating with the tunnel and arranged to supply air to the same at the vacuum space between the slip stream of the propeller and the walls of the tunnel free from pressure produced by the forward movement of the vehicle.

23. A propeller driven vehicle including a body having means forming an air tunnel with walls excluding from the tunnel air pressure produced by the forward movement of the vehicle, and a propeller operating in the tunnel, said body being also provided with means forming a longitudinal air channel located exteriorly of the tunnel and having closed front and rear ends and communicating with the tunnel in rear of the propeller and provided with means for feeding air free from the pressure produced by the forward movement of the vehicle to the tunnel at the vacuum space between the slip stream of the propeller and the walls of the tunnel.

24. A propeller driven vehicle including a body having means forming an air tunnel with walls excluding from the tunnel air pressure produced by the forward movement of the vehicle, forward and rear propellers operating within the tunnel, and means for feeding air free from the pressure produced by the forward movement of the vehicle to the tunnel at points in rear of the forward and rear propellers to the vacuum spaces between the slip streams of said propellers and the walls of the tunnel.

25. A propeller driven vehicle including a body having means forming an air tunnel extending through the body and having walls excluding from the tunnel air pressure produced by the forward movement of the vehicle, and fore and aft propellers operating within the tunnel, said body being also provided with means forming exteriorly of the tunnel a longitudinal air channel provided with openings located in rear of the fore and aft propellers and communicating with the tunnel for supplying air to the vacuum spaces between the slip streams of the propellers and the walls of the tunnel free from pressure produced by the forward movement of the vehicle.

26. A propeller driven vehicle of the automobile type including a body having means forming a longitudinal tunnel extending through the body and having walls excluding from the tunnel air pressure produced by the forward movement of the vehicle, a propeller operating within the tunnel, said body being provided with means for feeding air free from the pressure produced by the forward movement of the vehicle to the tunnel in rear of the propeller at the vacuum space between the slip stream of the propeller and the walls of the tunnel, and a motor carried by the body and operatively connected with the propeller.

27. A propeller driven surface vehicle including a body having means forming a longitudinal tunnel extending entirely through the body and having walls excluding from the tunnel air pressure produced by the forward movement of the vehicle, a propeller operating within the tunnel, means for forming air reservoirs at opposite sides of the body consisting of channels extending to the exterior of the body and communicating with the tunnel in rear of the propeller and arranged for feeding air free from the pressure produced by the forward movement of the vehicle to the tunnel at the vacuum space between the slip stream of the propeller and the walls of the tunnel.

28. A propeller driven surface vehicle including a body having means forming a longitudinal tunnel extending through the body and having a flaring entrance and provided with walls excluding from the tunnel air pressure produced by the forward movement of the vehicle, and a propeller operating within the body adjacent the inner end of the flaring entrance, said body being provided with a passenger compartment and having means for forming an air channel exteriorly of the passenger compartment leading to the tunnel and arranged for supplying air free from the pressure produced by the forward movement of the vehicle to the vacuum space between the slip stream of the propeller and the walls of the tunnel.

29. A propeller driven vehicle including a vehicle actuating propeller, and a body having means for forming an air tunnel extending through it and receiving the slip stream of the propeller and having walls straight longitudinally of the body from the entrance of the tunnel to the rear end of the body and excluding from the tunnel air pressure produced by the forward movement of the vehicle, and means for supplying air free from pressure produced by the forward movement of the body to the tunnel at the vacuum space between the slip stream of the propeller and the walls of the tunnel.

30. A propeller driven vehicle including a vehicle actuating propeller, and a body having means forming an air tunnel extending through it and arranged to receive the slip stream of the propeller, said tunnel being provided at the front end of the body with a flaring entrance and having walls straight longitudinally of the body from the flaring entrance to the rear end of the body and excluding from the tunnel air pressure produced by the forward movement of the vehicle, and means for supplying air free from pressure produced by the forward movement of the vehicle to the tunnel at the vacuum space between the slip stream of the propeller and the walls of the tunnel.

31. A propeller driven vehicle having means forming an air tunnel extending through the body of the vehicle and provided with a flaring entrance and having walls excluding from the tunnel air pressure produced by the forward movement of the vehicle, and a propeller operating in the flaring entrance and producing a pre-slip stream within said flaring entrance and creating a vacuum space between the pre-slip stream and the walls of the flaring entrance and thereby eliminating air pack resistance to the forward movement of the vehicle.

32. A propeller driven vehicle including a body provided with means forming an air tunnel with walls excluding from the tunnel air pressure produced by the forward movement of the vehicle, said body being also provided with means forming a channel with side portions located exteriorly of the tunnel at opposite sides thereof and extending from the upper portion of the tunnel to the lower portion of the body and communicating with the tunnel and arranged for feeding air free from the pressure produced by the forward movement of the vehicle to the tunnel, and a propeller having its slip stream passing through the tunnel.

33. A propeller driven vehicle including a body provided with means forming an air tunnel having walls excluding from the tunnel air pressure produced by the forward movement of the vehicle, a propeller operating in the tunnel, means forming an air channel extending from the top portion of the tunnel to the bottom of the body and provided at a plurality of points with openings communicating with the tunnel, said channel being arranged for feeding air to the tunnel free from pressure produced by the forward movement of the vehicle.

34. A propeller driven vehicle including a propeller, a body provided with means forming a longitudinal air tunnel extending through the body and having top, bottom and side walls excluding from the tunnel air pressure produced by the forward movement of the vehicle, said propellers being located within the tunnel which receives the slip stream of each propeller, and means for feeding air free from the pressure produced by the forward movement of the vehicle to the tunnel at the vacuum space between the slip stream of each propeller and the walls of the tunnel at both sides thereof by vacuum action from within the tunnel without destroying or interfering with the travel of the slip streams or diminishing the velocity thereof.

35. A propeller driven vehicle including a body presenting at the sides and top a continuous unbroken surface and having means forming a longitudinal air tunnel having walls excluding from the tunnel air pressure produced by the forward movement of the vehicle, a plurality of propellers arranged within the tunnel at spaced points, and means for feeding air free from pressure produced by the forward movement of the vehicle to the tunnel at the vacuum space between the slip stream of each propeller and the walls of the tunnel at a point in rear of each propeller, those portions of the walls of the tunnel immediately surrounding the propellers being continuous and entirely closed for confining the operation of the propellers to the air entering the tunnel at the front thereof.

THOMAS M. FINLEY.